United States Patent
Rodney

(10) Patent No.: US 7,197,929 B2
(45) Date of Patent: Apr. 3, 2007

(54) MOTION-RESPONSIVE COUPLED MASSES

(75) Inventor: Paul F. Rodney, Spring, TX (US)

(73) Assignee: Halliburton Energy Services, Inc., Houston, TX (US)

( * ) Notice: Subject to any disclaimer, the term of this patent is extended or adjusted under 35 U.S.C. 154(b) by 61 days.

(21) Appl. No.: 11/062,378

(22) Filed: Feb. 22, 2005

(65) Prior Publication Data

US 2005/0183502 A1 Aug. 25, 2005

Related U.S. Application Data

(60) Provisional application No. 60/546,748, filed on Feb. 23, 2004.

(51) Int. Cl.
 *G01P 9/04* (2006.01)
(52) U.S. Cl. .................. 73/504.12; 73/504.14
(58) Field of Classification Search ............ 73/504.02, 73/504.04, 504.12, 504.14, 510, 511, 493
See application file for complete search history.

(56) References Cited

U.S. PATENT DOCUMENTS 4,930,351 A * 6/1990 Macy et al. ............. 73/504.04
5,672,949 A * 9/1997 Ward ........................ 318/609
5,996,409 A * 12/1999 Funk et al. .............. 73/504.04

FOREIGN PATENT DOCUMENTS

EP     1359391    * 11/2003
GB     2301669    * 12/1996

* cited by examiner

*Primary Examiner*—Helen Kwok
(74) *Attorney, Agent, or Firm*—Schwegman, Lundberg, Woessner and Kluth P.A.

(57) ABSTRACT

In some embodiments, an apparatus and a system, as well as a method and an article, may include coupling a plurality of masses to provide a plurality of output signals responsive to motion relative to a common axis. Moving the plurality of masses at a substantially common frequency, moving a subset of the plurality of masses out of phase with the remainder of the plurality of masses, and combining the plurality of output signals to provide a combined signal associated with a response property of at least one of the plurality of masses may also be included.

38 Claims, 10 Drawing Sheets

MOTION-RESPONSIVE COUPLED MASSES

PRIORITY CLAIM

This application claims the benefit of priority under 35 U.S.C. § 119(e) to U.S. Provisional Patent Application Ser. No. 60/546,748, titled "Coupled Gyroscopes", filed on Feb. 23, 2004, incorporated herein by reference in its entirety.

TECHNICAL FIELD

Various embodiments described herein relate to motion-responsive masses generally, including gyroscopes.

BACKGROUND INFORMATION

Vibratory gyroscopes may be used to determine the rotation rate of an object, and can be modeled as a spring mass system in three-dimensions. Energy may be transferred from one vibrating mode to another by the Coriolis force, experienced by bodies in a non-inertial reference frame (e.g., in a rotating reference frame). Design issues for some types of vibratory gyroscopes may include the detection of sense axis displacements that are orders of magnitude less than the drive amplitude, while reducing the degree of coupling between drive and sense motions.

DETAILED DESCRIPTION

Figure 1:
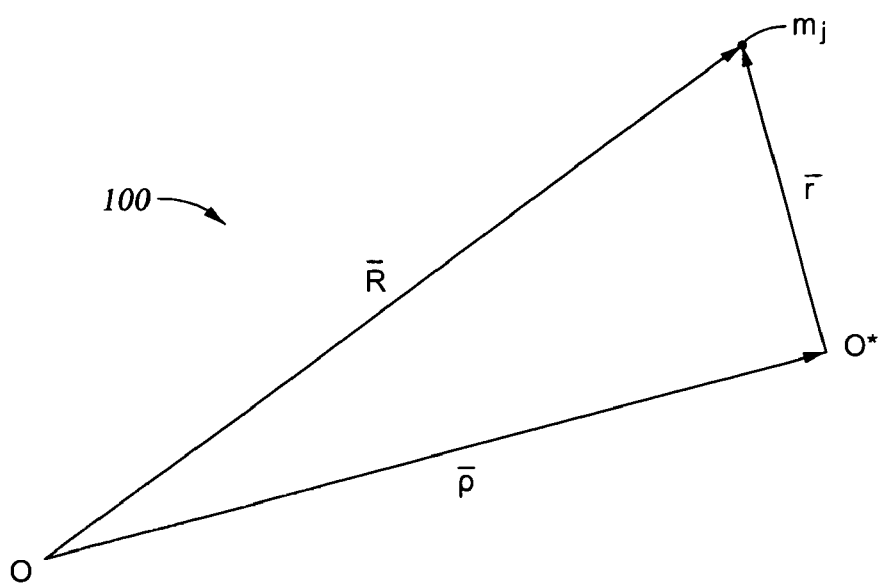
FIG. 1 illustrates a moving coordinate system 100 according to various embodiments of the invention.

Throughout this document, it should be noted that various techniques are discussed with respect to gyroscopes. However, such discussion should be understood to constitute examples of what is possible, and the various embodiments disclosed herein are not to be so limited. Thus, in many cases, one or more moving masses may be substituted for the term "gyroscope", so that various embodiments described with respect to gyroscopes may also be implemented using one or more moving masses.

In some embodiments, a plurality of coupled masses, including masses contained in gyroscopes, can be used to sense movement, velocity, and acceleration. For example, gyroscopes may be coupled together as synchronized, phased arrays to achieve a significant improvement in performance over that achieved using an individual gyroscope.

For example, in some embodiments, two gyroscopes may be coupled to form a gyroscope system and excited (driven) so they respond as a single gyroscope. For such a gyroscope system, if the two gyroscopes are of substantially similar design, then summing their outputs with the phase of one gyro shifted by about 180 degrees with respect to the other, should cause the combined output to vanish.

As an initial example, consider Table I, illustrating four excitation cases for a two-gyro system (e.g., gyroscopes 1 and 2): (a) gyro 1 and gyro 2 are both in phase, (b) gyro 1 is at original phase, gyro 2 is 180 degrees out of phase from the original phase, (c) gyro 1 is 180 degrees out from original phase, gyro 2 is at the original phase, and (d) both gyros 1 and 2 are 180 degrees out from the original phase. If the outputs of gyros 1 and 2 are summed, the combined output in cases (a) and (d) are identical in magnitude, but the phase has been shifted by 180 degrees. The combined output in cases (b) and (c) vanishes.

TABLE I

| Case | Phase of gyro A | Phase of gyro B | Output of combined gyro |
|---|---|---|---|
| A | 0° | 0 | $\Omega(G1 + G2) + b1 + b2$ |
| B | 0° | 180° | $\Omega(G1 - G2) + b1 + b2$ |
| C | 180° | 0° | $\Omega(-G1 + G2) + b1 + b2$ |
| D | 180° | 180° | $-\Omega(G1 + G2) + b1 + b2$ |

If the phase of both gyroscopes 1 and 2 is flipped by 180° from that shown in cases (b) and (c), the combined system output should still be zero if the gyroscopes are identical. If, however, the gyroscopes have different gains (G1≠G2) or biases (b1≠b2), the output of the gyroscope system will be non-zero. Thus, it may be useful to change gyroscope phases to determine bias in certain applications.

Assume that gyroscopes 1 and 2 in the system respond linearly to their input excitations (i.e., the drive axis and the sense axis), and assume that there is a constant angular rate of rotation $\Omega$ about the sense axis of each gyroscope. Also, suppose the gains and biases of each gyroscope are represented by G1, b1, and G2, b2 respectively.

If the combined output for a given case may be defined as $C_i$, for i=1, 2, 3 and 4, then the response to four possible excitations are as follows:

$$C_2+C_3=2\cdot(b_1+b_2) \quad (1)$$

$$C_1+C_4=2\cdot(b_1+b_2) \quad (2)$$

$$C_1+C_2=2\cdot G1\cdot\Omega+2\cdot(b_1+b_2) \quad (3)$$

$$C_1+C_3=2\cdot G2\cdot\Omega+2\cdot(b_1+b_2) \quad (4)$$

Combining equations (1) and (3) yields $2\cdot G1\cdot\Omega$, and combining equations (1) and (4) yields $2\ G2\cdot\Omega$. By monitoring the output of each gyro individually, $b_1$, may be obtained by subtracting $G1\cdot\Omega$ from the output of gyro 1, and $b_2$ may be obtained by subtracting $G2\cdot\Omega$ from the output of gyro 2. Thus, it can be seen that using these equations may permit the ratio of the gains of each gyro in the system may be obtained.

In some embodiments, coupled gyroscopes may have their sense axes aligned with each other. However, such alignment can make obtaining useful information from the gyroscope system difficult in some circumstances. If the sense axis of the gyroscopes in the system are non-collinear (e.g., the sense axes are orthogonal to each other), a coupled gyroscope system may still be implemented. For example, the coupling axis may be varied and the effective sense axis rotated so as to provide a more generalized virtual gimbaling effect than has previously been described. In particular, by choosing to use gyros having sense axes with different orientations (and in particular, perpendicular, or near perpendicular), one may be able to generalize the virtual gimbaling concept so as to move the effective sense axis of the composite system to any desired orientation.

Some types of vibratory gyroscopes are called "tuning fork" gyroscopes. Such gyroscopes can make use of the so-called Coriolis force to sense their rate of rotation relative to an inertial reference frame.

FIG. 1 illustrates a moving coordinate system 100 according to various embodiments of the invention. For example, consider a plurality of point masses coupled by lossy springs to a reference frame (e.g., non-inertial), as well as to each other. Let $m_j$ designate the $j^{th}$ mass, located relative to the origin O* of the reference frame by the vector $\vec{r}_j$. O* is located relative to the fixed origin O of an inertial reference frame by the vector $\vec{\rho}$, which is known. Assuming that the moving coordinate system 100 of FIG. 1 represents a drilling rig tool body, $\vec{\rho}$ can be used to locate the tool coordinates relative to the fixed origin O. $\overline{R}$ can be used to located the point mass of a sensor (e.g., moving mass in a gyroscope) relative to the origin O. $\vec{r}$ can be used to locate the point mass of the sensor relative to O*, that is, relative to the tool coordinates.

As observed in the O* frame, the force $\vec{F}_j$ on mass j may be given by $$\vec{F}_j = m_j \cdot \left[ \frac{d^2}{dt^2} \vec{r}_j + \vec{\Omega} \times (\vec{\Omega} \times \vec{r}_j) + \right. \tag{5}$$

$$\left. 2 \cdot \vec{\Omega} \times \frac{d}{dt} \vec{r}_j + \frac{d}{dt}(\vec{\Omega} \times \vec{r}_j) + \left( \frac{d^2}{dt^2} \vec{\rho}_j \right)_{\text{inertial\_frame}} \right]$$

Assume the definition:

$$\vec{a} \equiv \left( \frac{d^2}{dt^2} \vec{\rho}_j \right)_{\text{inertial\_frame}}.$$

In equation (5) $\overline{\Omega}$ can be used to represent the angular velocity of the frame O* relative to O. Thus, the force on particle j may be given by:

$$\vec{F}_j = -\vec{\kappa}_j \cdot \vec{r}_j - s_j(\overrightarrow{r_j}) - \vec{\gamma}_j \cdot \frac{d}{dt} \vec{r}_j - \vec{C}_j + \vec{D}_j. \tag{6}$$

Therefore:

$$m_j \cdot \frac{d^2}{dt^2} \vec{r}_j + \vec{\kappa}_j \cdot \vec{r}_j + s_j(\overrightarrow{r_j}) + \vec{\gamma}_j \cdot \frac{d}{dt} \vec{r}_j + \vec{C}_j = \tag{7}$$

-continued
$$2 \cdot m_j \cdot \frac{d}{dt}(\vec{r}_j \times \vec{\Omega}) + \vec{D}_j - m_j \cdot \left[ \vec{\Omega} \times (\vec{\Omega} \times \vec{r}_j) + \frac{d}{dt}(\vec{\Omega} \times \vec{r}_j) + \vec{a} \right].$$

In equations (6) and (7), $$\vec{\kappa}_j$$

is a tensor term which functions as the spring constant, $$\vec{\gamma}_j$$

is a tensor term which functions as the velocity-dependent damping term, $$[s_j(\overrightarrow{r_j})]$$

represents nonlinearity in the response of the system (and could also be generalized to a tensor), and $-\vec{C}_j$ is the net force acting on $m_j$ from all of the other masses in the system. It is anticipated that $-\vec{C}_j$ may be expressed as a linear sum of the displacements of the other masses relative to mass j. Finally, $\vec{D}_j$ represents the driving force applied to the mass by external electronics (e.g., one or more drivers).

In order to simulate such a system, it is useful to convert the time derivatives to finite differences. Thus, if the sample period is τ, then we can write:

$$\overrightarrow{r_{j,k+1}} \cdot m_j + \overrightarrow{r_{j,k+1}} \cdot \frac{\vec{\gamma}_j \cdot \tau}{2} - \overrightarrow{r_{j,k+1}} \times \overrightarrow{\Omega_k} \cdot \tau \cdot m_j = \overrightarrow{D_{j,k}} \cdot \tau^2 + 2 \cdot \overrightarrow{r_{j,k}} \cdot m_j - \tag{8}$$

$$\overrightarrow{r_{j,k}} \cdot \vec{\kappa}_j \cdot \tau^2 - m_j \cdot \left[ (\overrightarrow{r_{j,k}} \times \overrightarrow{\Omega_k} \cdot \tau) \times \overrightarrow{\Omega_k} \cdot \tau - \overrightarrow{r_{j,k}} \times \left( \frac{d}{dt} \Omega \right)_k \cdot \tau^2 \right] -$$

$$\overrightarrow{r_{j,k-1}} \cdot m_j + \overrightarrow{r_{j,k-1}} \cdot \frac{\vec{\gamma}_j \cdot \tau}{2} - \overrightarrow{r_{j,k-1}} \times \overrightarrow{\Omega_k} \cdot \tau \cdot m_j -$$

$$s_j \cdot (\overrightarrow{r_{j,k}}) \cdot \tau^2 - \overrightarrow{C_{j,k}} \cdot \tau^2 - m_j \cdot \frac{d^2}{dt^2} \vec{\rho}_j \cdot \tau^2$$

where k is a sample number. The system can then be simulated by solving for the $k+1^{th}$ term given the $k^{th}$ and $k-1^{th}$ terms. For the sake of notational convenience, the above equation can be written as:

$$\overrightarrow{r_{j,k+1}} \cdot m_j + \overrightarrow{r_{j,k+1}} \cdot \frac{\vec{\gamma}_j \cdot \tau}{2} - \overrightarrow{r_{j,k+1}} \times \overrightarrow{\Omega_k} \cdot \tau \cdot m_j = \overrightarrow{A_{j,k}} \tag{9}$$

where $\vec{A}_{j,k}$ is given by the right-hand side of equation (8). Rewriting equation (9) in Cartesian coordinates and solving for the $k+1^{th}$ term:

$$\begin{pmatrix} m_j + \frac{\gamma_{j,x,x} \cdot \tau}{2} & -\Omega_{k,z} \cdot \tau \cdot m_j & \Omega_{k,y} \cdot \tau \cdot m_j \\ \Omega_{k,z} \cdot \tau \cdot m_j & m_j + \frac{\gamma_{j,y,y} \cdot \tau}{2} & -\Omega_{k,x} \cdot \tau \cdot m_j \\ -\Omega_{k,y} \cdot \tau \cdot m_j & \Omega_{k,x} \cdot \tau \cdot m_j & m_j + \frac{\gamma_{j,z,z} \cdot \tau}{2} \end{pmatrix} \cdot \begin{pmatrix} r_{j,k+1,x} \\ r_{j,k+1,y} \\ r_{j,k+1,z} \end{pmatrix} = \quad (10)$$

$$\begin{pmatrix} A_{j,k,x} \\ A_{j,k,y} \\ A_{j,k,z} \end{pmatrix}.$$

Once the initial conditions and excitations are specified, equation (10) may be solved iteratively for the dynamic behavior of the system, since it can be established that equation (10) is invertible for any physically realizable configuration.

Figure 2:
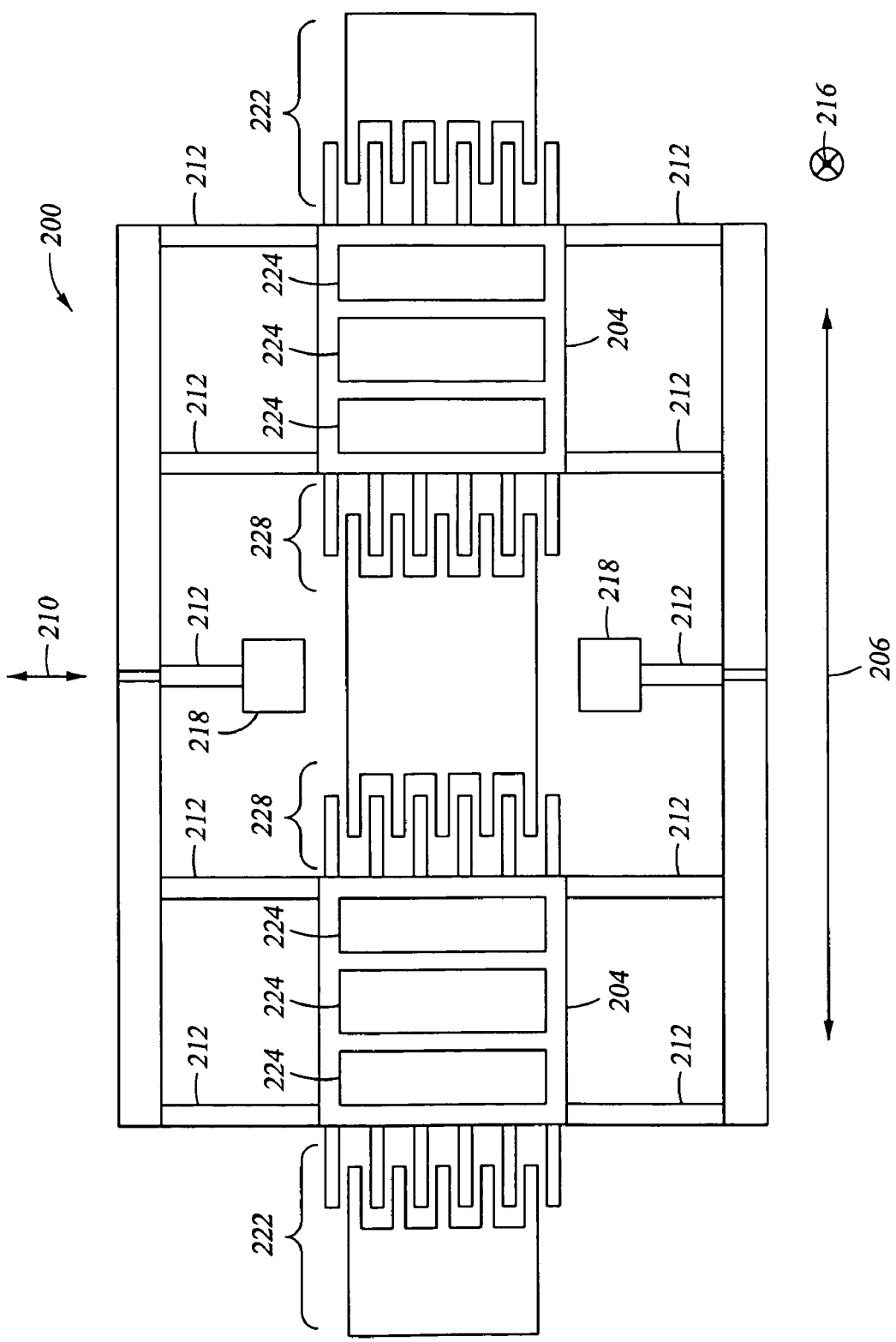
FIG. 2 is a top plan view of a gyroscope according to various embodiments of the invention.

FIG. 2 is a top plan view of a gyroscope 200 according to various embodiments of the invention. The gyroscope 200 may be approximated as a pair of masses 204, perhaps driven electrostatically so as to vibrate anti-parallel (e.g., along the axis 206) to each other, and orthogonal to a common sense axis 210. The masses 204 may be coupled by springs 212. In some embodiments, the gyroscope 200 may comprise one or more MEMS (microelectromechanical system) gyroscopes.

In response to an angular rate of rotation about the sense axis 210, the masses can deflect in a direction 216 that is orthogonal to the plane defined by the angular rate of rotation and the direction along which the electrostatic drive is applied (e.g., same direction as axis 206. Note that in some embodiments, such a system of moving masses 204 may not only resonate in the direction of the excitation, but also in the response direction (i.e. orthogonal to the sense axis and the electrical excitation).

In some embodiments, the response resonant frequency may be selected so as to be quite close to the excitation resonant frequency, subject to practical limitations known to those of skill in the art. Because of various differences between the moving masses 204 and between the springs 212 coupling the masses to the rotational node 218, the masses 204 may not resonate at the same frequency. However, the equations discussed previously make it possible to deal with a gyroscope 200 as though it were a single mass spring (e.g., one of two identical elements), or two dissimilar masses and springs, coupled together.

Capacitors 222 on the edges of the masses 204 may serve to monitor their deflection along the electric drive axis, and capacitors 224 above and beneath the masses may serve to measure their deflection orthogonal to the plane of the sense axis and the drive axis. The capacitors 222 along the drive axis (and the capacitors 228 that serve to apply the electric field to the masses in order to accelerate them) may comprise a comb-like structure.

Physical parameters for MEMS gyroscopes are available in the literature. For example, more information regarding the properties of micromachined gyroscopes may be obtained by referring to "Nonresonant Micromachined Gyroscopes With Structural Mode-Decoupling," Cenk Acar and Andrei M. Shkel, IEEE Sensors Journal, Vol. 3, No. 4, August, 2003, Pgs. 497 et seq., included herein by reference in its entirety.

Material considerations with respect to moving masses, such as those contained in MEMS gyroscopes, will now be discussed to determine a useful analytic sampling frequency.

It should be noted that while "typical" physical properties for a MEMS gyroscope are discussed, the various embodiments disclosed herein are not to be so limited.

The published literature describing MEMS gyroscopes notes that the typical density of the material used to construct gyroscopes similar to gyroscope 200 may be on the order of $$\rho = 2331 \; \frac{\text{kg}}{\text{m}^3}.$$

Similarly, the typical length of a single spring 212 may be on the order of L=0.0005 m, and the typical width of the springs 212 may be on the order of $t=10^{-5}$ m. A typical Young's modulus of the gyroscope material may be on the order of $$E = 1.6578 \; 10^{11} \; \frac{N}{\text{m}^2},$$

and resonant frequencies are typically on the order of 10 KHz.

The literature also notes the following relationship:

$$k_x = 2 \cdot E \cdot t \cdot \left(\frac{w}{L}\right)^3; \quad (11)$$

where w is the breadth of the beam, the length is L, and the width is t.

By analogy, the following can be written:

$$k_z = 2 \cdot E \cdot w \cdot \left(\frac{t}{L}\right)^3. \quad (12)$$

Resonant frequencies may be defined as:

$$\omega_{0x} = \sqrt{\frac{k_x}{m}} \quad (13)$$

and $$\omega_{0z} = \sqrt{\frac{k_z}{m}}. \quad (14)$$

Quality factors may be defined as:

$$Q_x = \frac{\omega_{0x} \cdot m}{\gamma_x} \quad (15)$$

and $$Q_z = \frac{\omega_{0z} \cdot m}{\gamma_z}. \quad (16)$$

Using the definition of density, an element's mass may be given by: m=ρ·t·ω·L (17).

By utilizing various combinations of the above equations, the following equations may be obtained:

$$w = \frac{\omega_{0x}}{\omega_{0z}} \cdot t \qquad (18)$$

and $$m = \frac{E \cdot t^4 \cdot f_{0x}}{2 \cdot \pi^2 \cdot f_{0z}^3 \cdot L^3}$$

where $$\omega_{0x} = 2 \cdot \pi \cdot f_{0x} \qquad (19)$$

and $$\omega_{0z} = 2 \cdot \pi \cdot f_{0z}.$$

In some embodiments of the invention, Q values on the order of $10^4$ may be used in the analysis. While damping coefficients may be defined in terms of the gas content of the gyroscope 200, such expressions are quite complicated. Therefore, to simplify the analyses given herein, damping factors are calculated by specifying Q values and using equations (15) and (16).

With the above information, it is possible to simulate multiple coupled mass systems. However, the accuracy of the results may decrease as the sampling frequency decreases. The analysis that follows illustrates a useful (but by no means the only) mechanism for selecting a simulation sampling frequency. Those of skill in the art will realize, after reading the material disclosed herein, that aliasing may contribute to errors in interpreting simulation results. For this reason, the sampling frequency may be set to 1,111,111 Hertz for simulation analyses. A similar sampling frequency may be used in a physical system.

To determine a sampling frequency, the problem of a single linear oscillator will be considered. The equation of motion is may be set forth as:

$$m \cdot \frac{d^2}{dt^2} x + \gamma \cdot \left(\frac{d}{dt} x\right) + K \cdot x = f,$$

where f is the driving force. In terms of finite differences, $$m \cdot fs^2 \cdot (x_{i+1} + x_{i-1} - 2 \cdot x_i) + \gamma \cdot fs \cdot \left(\frac{x_{i+1} - x_{i-1}}{2}\right) + K \cdot x_i = f_i;$$

where $f_s$ is the sampling frequency and $f_i$ is the excitation frequency at instant i.

Defining the transfer function $H(\omega)$ as the ratio of the frequency domain displacement to the frequency domain force, the following transfer function may be obtained:

$$H(\omega) = \frac{1}{\left[m \cdot fs^2 \cdot \left(2 \cdot \cos\left(\frac{\omega}{fs}\right) - 2\right) + \gamma \cdot i \cdot fs \cdot \sin\left(\frac{\omega}{fs}\right) + K\right]}.$$

If the sample frequency is much higher than any other frequencies of interest, the transfer function may be set forth as:

$$H(\omega) = \frac{1}{(K - m \cdot \omega^2 + i \cdot \omega \cdot \gamma)},$$

which is the standard result obtained using calculus.

Detailed examination of this function shows that in some embodiments it may be useful to choose a sampling frequency about ten times greater than any other frequency of interest. It should be noted that this can be accomplished using a single gyroscope 200, in at least two different ways. First, one may track movement (e.g., swinging) in one direction and separate it from the movement (e.g., swinging) in the other direction. Second, one may define a gyroscope 200 as a pair of masses 204, driven out of phase, such as about 180° degrees out of phase. However, unless the masses 204 and their suspension springs 212 are substantially identical, they will not respond identically when driven 180° out of phase (due to the different resonant frequencies). Thus, in some embodiments, better results may be obtained using two physically different gyroscopes 200.

One mechanism for removing bias in a conventional rotary gyroscope is to physically flip the gyro 180° about an axis orthogonal to its spin axis, since this reverses the direction of the gyroscope's response to rotation. The gyro will then respond in the opposite sense. A tuning fork gyroscope (e.g., a MEMS gyroscope) is different from a rotary gyroscope in that the basic motion of the masses in the tuning fork gyroscope is an oscillatory linear displacement, i.e. the velocity changes sign twice a cycle, whereas a rotary gyroscope maintains nearly constant angular momentum along a single axis.

The Coriolis effect on a given mass in a tuning fork gyroscope during one part of a cycle is directly opposite to the Coriolis effect on that same mass during the next part of the cycle. If the output signal from the mass is used to sense rotation rate, any bias in the output will appear as an inequality in the output between one part of a cycle and the other. With a single gyroscope, there are at least two conceivable ways of providing this type of bias compensation. First, the positive-going output signal may be compared with the negative-going output signal from a single mass in the gyroscope. Second, the outputs from each of two masses in the gyroscope may be compared. For this type of comparison, the two masses should be excited about 180° out of phase, providing a kind of "virtual gimbaling" effect. In some embodiments, the two masses may be located in a single MEMS gyroscope. In some embodiments, the two masses may be located in separate MEMS gyroscopes.

Figure 3A:
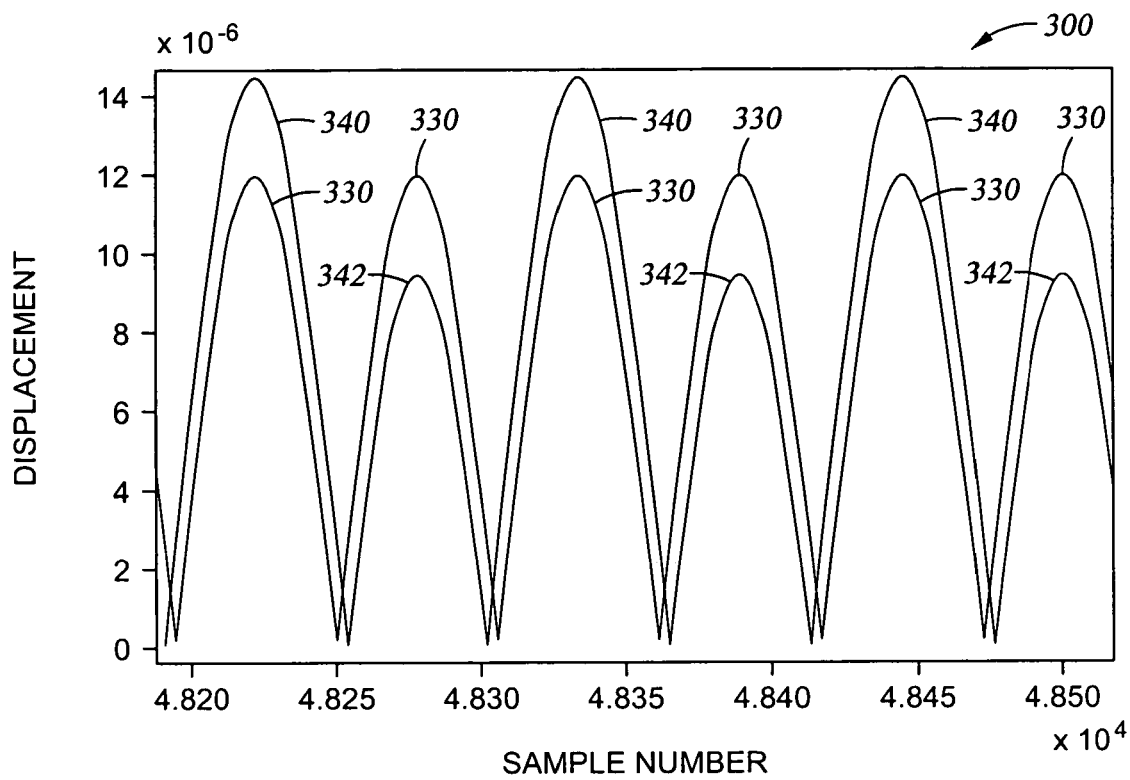
FIGS. 3A and 3B are graphs illustrating the outputs of two coupled masses, driven out of phase, according to various embodiments of the invention.
Figure 3B:
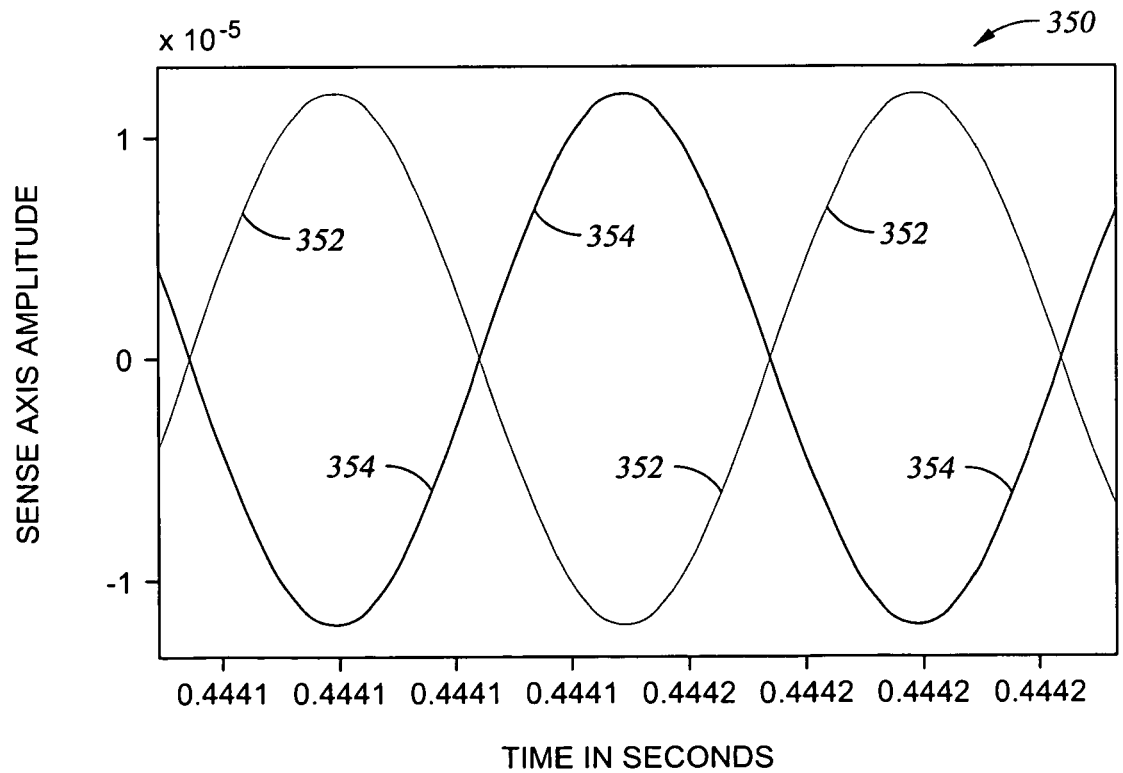

FIGS. 3A and 3B are graphs 300, 350 illustrating the outputs of two coupled masses, driven out of phase, according to various embodiments of the invention. The masses (which may be included in one or more gyroscopes) providing the outputs 340, 342 are assumed to be identical. While this situation is unlikely to occur in a practical sense, the outputs from two groups of masses (or gyroscopes) can be combined to provide two effective "gyroscopes" that are nearly identical. The outputs 340, 342 of the masses shown in the graph 300 have been altered, as may be the case when differing constant linear acceleration, bias, or both, after the phase of one has been shifted by 180° with respect to the phase of the other. As can be seen in the graph 300, the outputs are no longer identical; the absolute value has been shown in this graph 300 to emphasize the point.

In FIG. 3B, the concept of virtual gimbaling for two gyroscopes (e.g., two masses, two gyroscopes, or two groups of masses or gyroscopes) is shown where the outputs of each gyroscope are assumed identical. Here the gyroscopes may first be excited in phase. However, when the excitation phase of one is shifted relative to the other, the amplitude and phase displacements of the gyroscope having a changed excitation decreases, and in a few cycles, drops to zero, after which it recovers. Finally, the outputs 352, 354 of the two gyroscopes will be about 180 degrees out of phase.

Figure 4C:
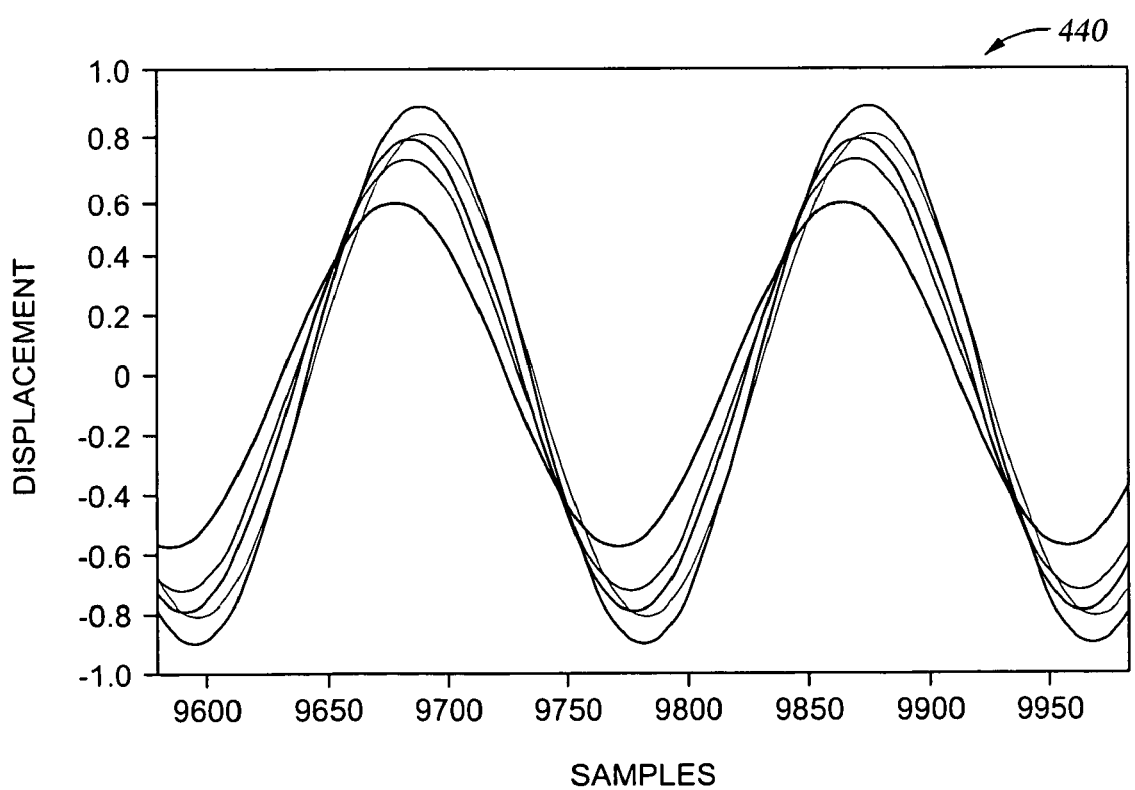
FIGS. 4A, 4B, and 4C are graphs illustrating gyroscope outputs with no coupling, linear coupling, and cubic (non-linear) coupling between the gyroscopes, respectively.
Figure 4A:
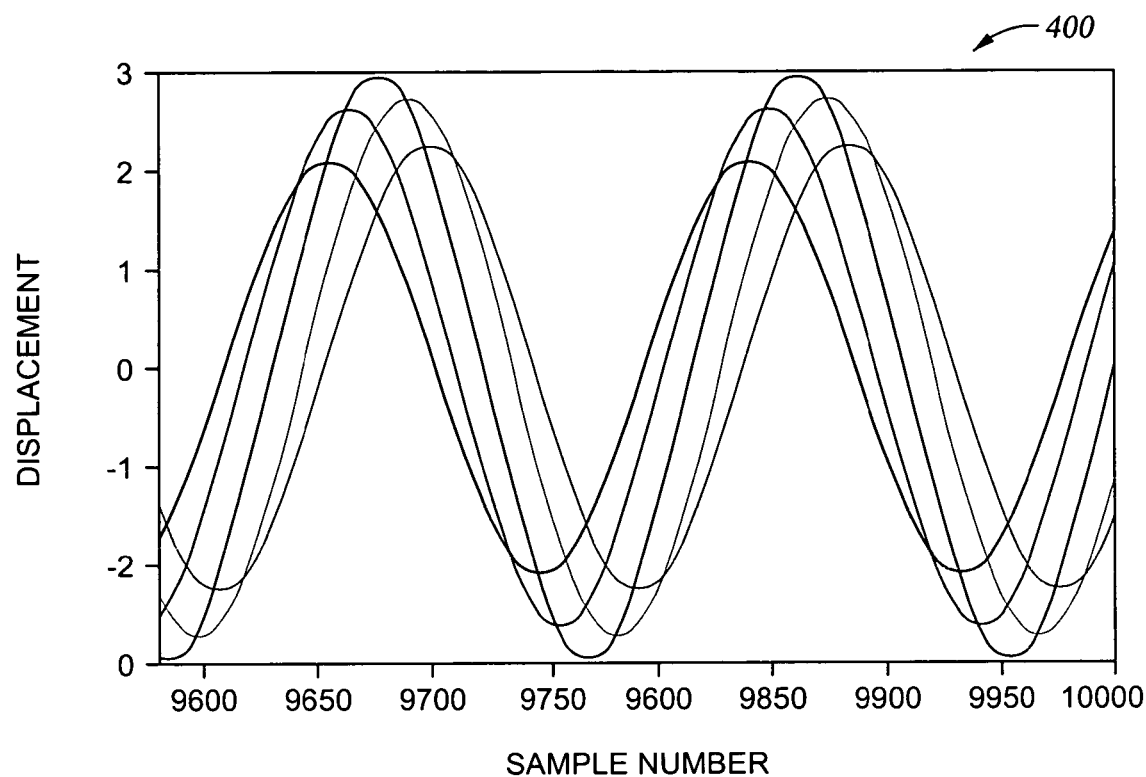
Figure 4B:
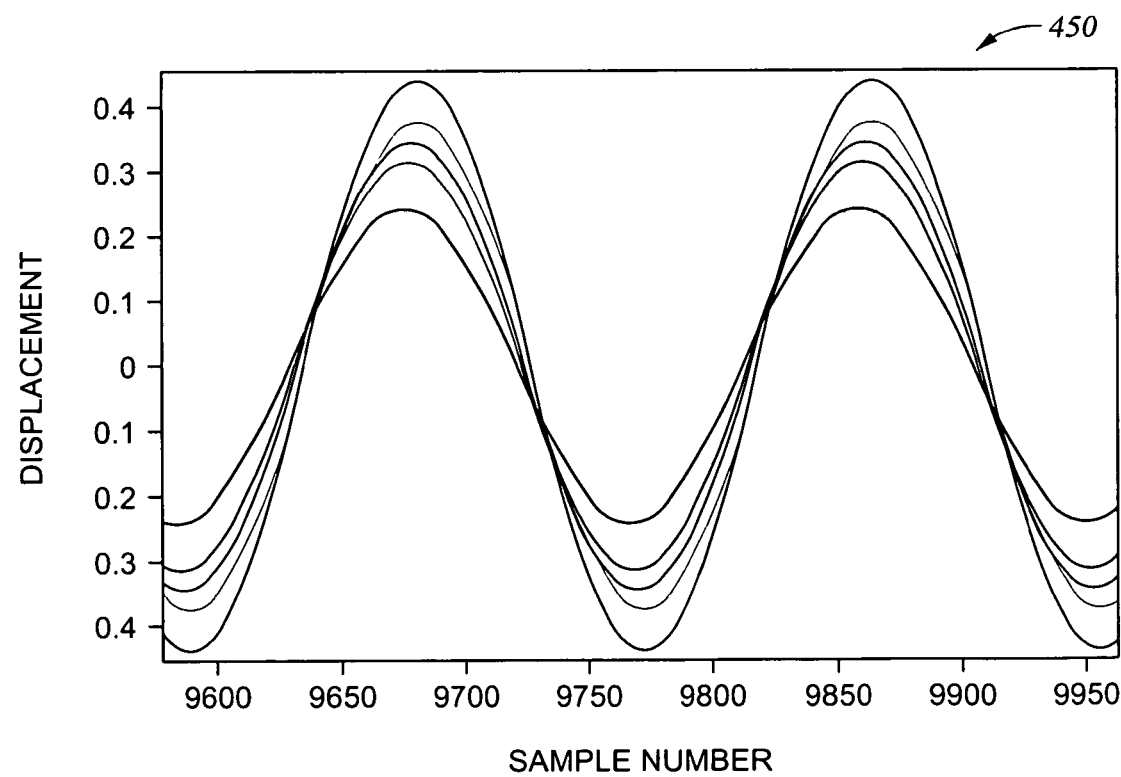

FIGS. 4A, 4B, and 4C are graphs 400, 420, 440 illustrating gyroscope outputs with no coupling, linear coupling, and cubic (nonlinear) coupling between the gyroscopes, respectively. The ordinates represent displacements along the sense axis, or sense-axis output signals. The abscissae represent sample numbers from the start of sampling (e.g., about 0.9 microseconds between samples, assuming a sampling frequency of about 1,111,111 Hertz). A constant angular velocity about the sense axis is assumed in all cases.

Here, the improvements possible using linear and nonlinear coupling of systems of gyros (or moving masses) experiencing a constant angular velocity along their sense axes can be seen. For example, in a simulation experiment, the output of five gyroscopes was analyzed, with each gyroscope having a slightly different resonant frequency (as may occur in many practical situations). The average resonant frequency of the system in all cases was set to 10,000 Hertz, such that all gyroscopes were driven at this frequency.

In FIG. 4A, the gyroscopes are driven with a common frequency, but are not coupled. Each follows the drive frequency, but responds at a different phase, and with a different amplitude.

In FIG. 4B, the outputs of the sense axes of the gyros are coupled together with a linear coupling and fed back to the input. Now all of the gyros are in phase, but the signal amplitude is reduced.

In FIG. 4C, the outputs of the sense axes of the gyros are coupled via a nonlinear coupling and fed back into the input. In this case, there is some phase dispersion among the various signals, but the signal amplitudes are about double what they were when linear coupling was used. Since all of the gyros are in phase in the linearly coupled case, and are nearly in phase in the nonlinearly coupled case, these systems appear to behave as a single gyroscope. However, the summed output produces a stronger signal than any single gyroscope. Summing the outputs of non-coupled gyroscopes may provide a stronger signal, but the phase among these is arbitrary, so the results may not be reproduced reliably. Hence, as shown in FIG. 4C, non-linear coupling may provide a more sensitive, summed-output gyroscope than any one of the individual component gyroscopic elements.

Analysis and numerical simulation have verified that an individual MEMS gyro can be tuned such that the drive axis resonates at the same frequency as the sense axis by choosing a drive axis resonant frequency that is somewhat less than the sense axis resonant frequency, and then driving the gyro with a signal sufficiently large to produce nonlinearities. Experimentation has shown that the frequency at which the drive axis resonates is an increasing function of the drive amplitude.

In some embodiments, a single MEMS gyro can be deemed to comprise two, or even four gyroscopes (e.g., masses responsive to movement). Since each MEMS gyroscope has two masses linked by two sets of springs, an individual MEMS gyroscope can be considered to comprise two gyroscopes since it is sufficient to study the motion of one of the masses in order to determine angular rotation. Further, since each mass moves back and forth in the direction of its excitation, the back and forth motions can be separated for both of the masses. By tracking the sign of the motion as each mass reverses direction, individual masses may serve as two gyroscopes. Thus, a single MEMS gyro can, in effect, serve as four gyroscopes.

Figure 5:
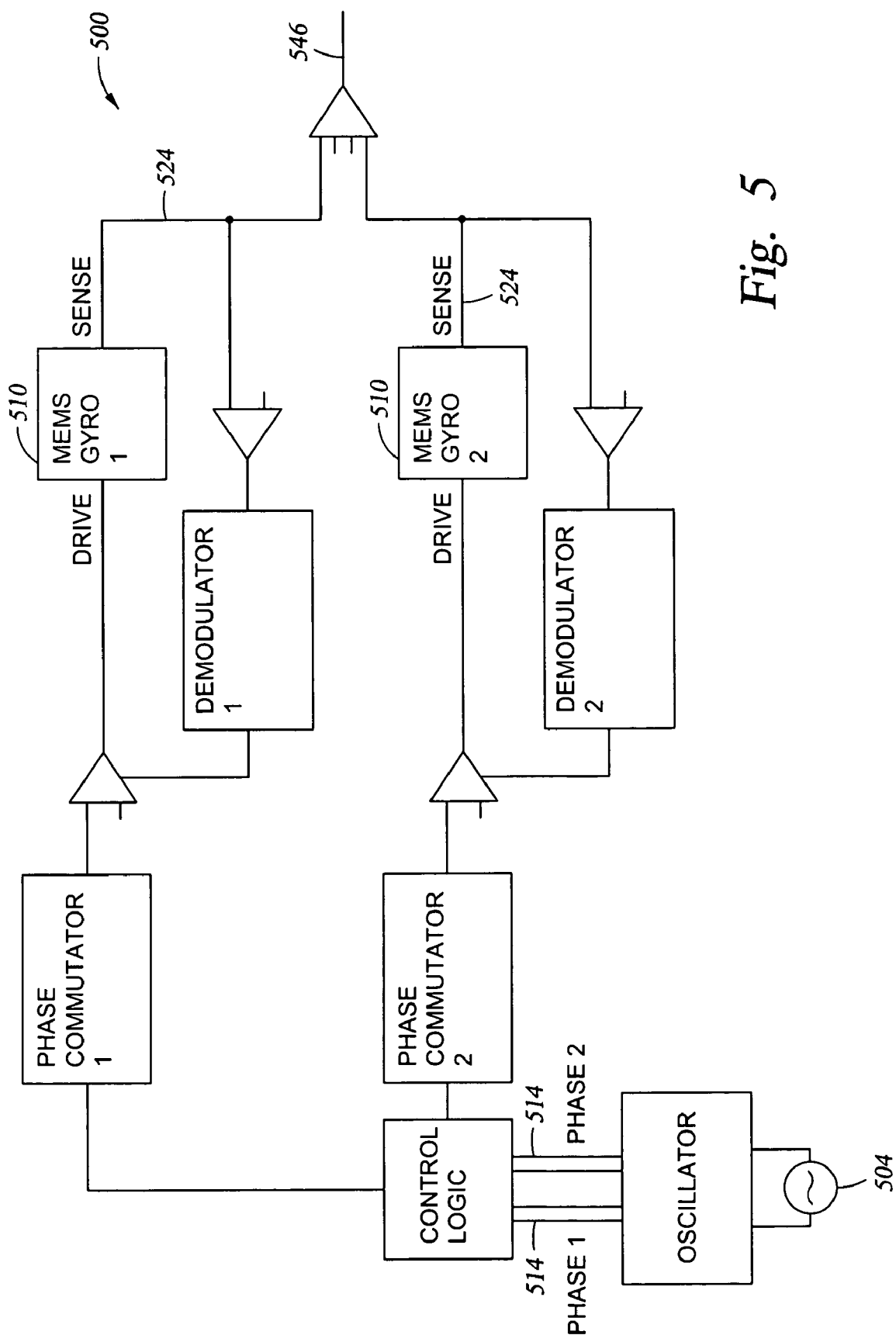
FIG. 5 is a schematic block diagram of apparatus according to various embodiments of the invention.
Figure 6:
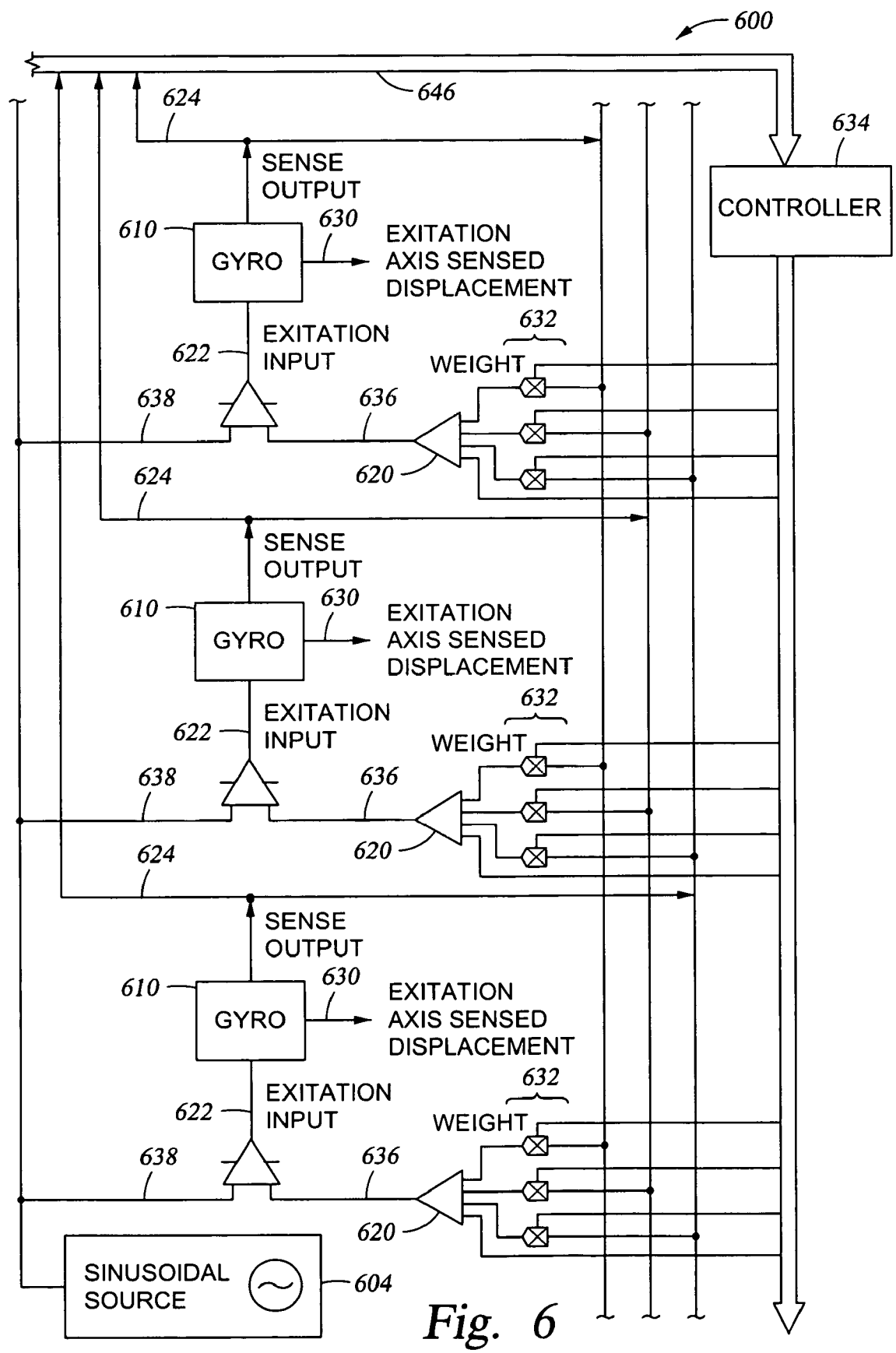
FIG. 6 is a schematic block diagram of apparatus providing weighted feedback according to various embodiments of the invention.

FIG. 5 is a schematic block diagram of an apparatus 500 according to various embodiments of the invention. FIG. 6 is a schematic block diagram of an apparatus 600 providing weighted feedback according to various embodiments of the invention. In some embodiments, a common oscillator 504, 604 may be used to drive all of the gyroscopes 510, 610. Variations include deriving signals of variable phase 514 from the common oscillator 504, 604 to drive the gyroscopes 510, 610. In some embodiments, a summing node 620 may be used at the excitation input 622 to the gyroscopes 510, 610. The summing node 620 may be replaced by a multiplier, as well as many other types of functions having multiple inputs, including linear and nonlinear functions.

In many embodiments, the gyroscopes 510, 610 may have a sense axis output 524, 624, as well as an output signal corresponding to the actual displacement of the drive axis (e.g., displacement output 630). The outputs 524, 624, and 630 may be measured via changes in capacitance as the gyroscope elements move with respect to their mounting. The outputs 524, 624, and 630 may be multiplied by weights 632, the magnitudes of which may be determined by a controller 634 that monitors the outputs 524, 624, and 630. The weighted outputs 636 may be combined in a number of ways to provide a combined output 546, 646, perhaps including or combined with the oscillator output 638 and directed to the excitation input 622 of the gyroscopes 510, 610. Although not shown, it should be noted that the oscillator output 638 may also be multiplied by a factor, set by the controller 634, before being summed (or multiplied, etc.) with the weighted outputs 636 applied to the excitation input 622 of a given gyroscope. In addition, programmable delay elements may be added along any of the paths shown in FIGS. 5 and 6 so as to modify the phase of any component signal.

The controller 634 may be programmed to carry out an algorithm, the specifics of which depend on the overall objective of coupling the gyros. If, for example, it is desired to substantially align all of the gyroscopes 510, 610 at a common phase, the controller 634 might monitor the phased input signals of all of the gyroscopes 510, 610 and implement a least squares routine to vary the system weights 632 so as to bring the sense axis outputs 524, 624 to a common phase.

Figure 7:
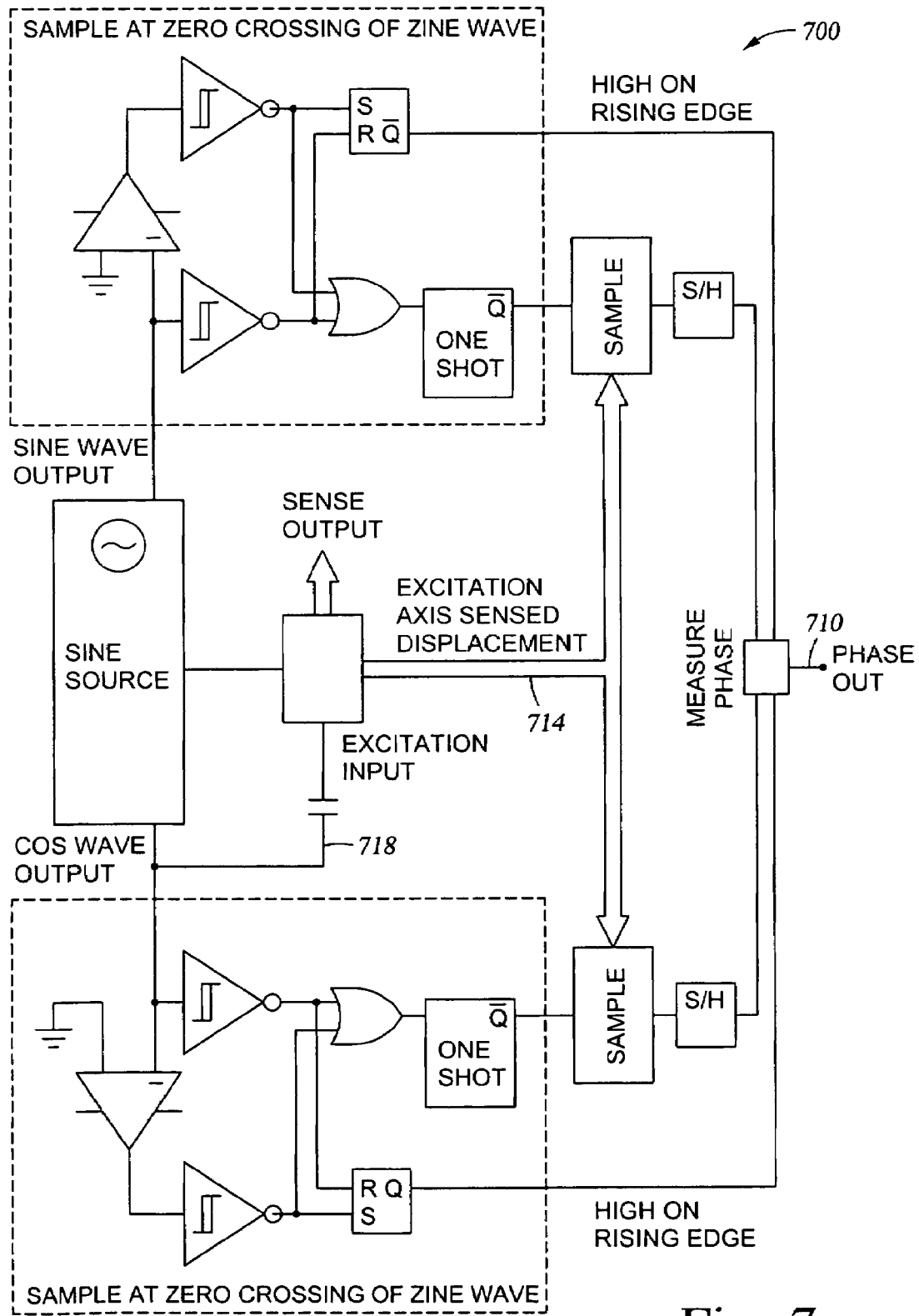
FIG. 7 is a schematic block diagram of phase displacement measurement circuitry according to various embodiments of the invention.

FIG. 7 is a schematic block diagram of phase displacement measurement circuitry 700 according to various embodiments of the invention, wherein the phase displacement 710 of the excitation axis signal 714 relative to the excitation drive signal 718 may be measured. Similar logic could be used for other relative phase measurements. Other means for measuring phase are well known to those of skill in the art.

The mechanisms for bringing moving masses into phase are almost limitless. For example, moving masses can be brought into phase in a pair-wise manner. In this approach, two moving masses (e.g., a pair of masses in a single MEMS gyroscope, or one mass in one gyroscope, and another mass in another gyroscope) are selected, perhaps from a group of masses, their phases measured, and the weights that affect those masses are adjusted until they are in phase to a pre-set tolerance, as determined by the maximum phase difference between the two signals.

The weights can be adjusted using a trial and error approach in which one weight is held constant, while the remaining weight is changed to a slightly larger value, and then to a slightly smaller value. In this manner, the rate of change of the relative phase as a function of that particular weight can be ascertained locally, i.e. at the current system operating point. Once the two moving masses are brought into phase, then a third moving mass can be chosen, and so on, until all of the moving masses are in phase. Alternatively, a cost function, comprising the sum of the absolute values of all of the phase differences within a group of moving masses can be minimized using a similar procedure so as to bring all of the moving masses to a common phase. It should be noted that a similar approach can be used to tune the excitation input signals to each of the gyroscopes so as to resonate at the same frequency. In this case, the excitation amplitude of each gyro is modified until the gyroscope resonates at the desired frequency.

Accordingly, as described, some embodiments of the invention provide for coupling individual gyroscopes to form a coupled gyroscope system. This may include coupling a first gyroscope and a second gyroscope to form a gyroscopic system and rotating a sense axis of the gyroscopic system to produce a virtual gimbal. Rotating the sense axis may be accomplished analytically, and the coupling may be such that an effective direction of the sense axis is modified.

Thus, many embodiments may be realized. For example, an apparatus may comprise a plurality of masses coupled to provide a corresponding plurality of output signals responsive to motion relative to a common axis, a driver module to periodically move the plurality of masses at a substantially common frequency (and to periodically move a subset of the plurality of masses out of phase with a remainder of the plurality of masses), and a combination module to combine the corresponding plurality of output signals to provide a combined signal associated with a response property of at least one of the plurality of masses.

The driver module may operate to periodically move the subset of the plurality of masses at the substantially common frequency and about 180 degrees out of phase with the remainder of the plurality of masses. The apparatus may also include an accelerometer to measure, as a portion of the combined signal, linear acceleration relative to a rest frame.

In some embodiments, the plurality of masses may comprise at least one pair of masses coupled to a common coupling beam (e.g., a single gyroscope, such as a single MEMS gyroscope), as well as a first proof mass in a first MEMS gyroscope and a second proof mass in a second MEMS gyroscope (e.g., dual-gyroscopes). In some embodiments, the apparatus may include a first driver circuit to receive a first feedback signal derived from the corresponding plurality of output signals and to drive a first group of the plurality of masses. The first feedback signal may be derived from a substantially linear combination (or a substantially nonlinear combination) of the corresponding plurality of output signals.

The apparatus may also include a second driver circuit to receive a second feedback signal derived from the corresponding plurality of output signals and to drive a second group of the plurality of masses. In this case also, the second feedback signal may be derived from a second substantially linear combination (or substantially nonlinear combination) of the corresponding plurality of output signals. The second combination may be the same as, or different from, the first combination of the corresponding plurality of output signals from which the first feedback signal is derived.

In some embodiments, the common axis may comprise an alignment axis of substantially maximum response sensitivity, which may be selected such that the alignment axis of substantially maximum response sensitivity for each one of the plurality of masses is aligned within about five angular degrees of the alignment axis of substantially maximum response sensitivity for every other one of the plurality of masses.

Other selections may be made. For example, the common axis may comprise an alignment axis of substantially maximum response sensitivity associated with a first group of the plurality of masses, and the alignment axis of substantially maximum response sensitivity for a second group of the plurality of masses may be aligned within about five angular degrees of the alignment axis of substantially maximum response sensitivity for the first group of the plurality of masses (or to some other axis, such as within about five angular degrees of an axis substantially orthogonal to the alignment axis of substantially maximum response sensitivity for the first group of the plurality of masses).

Figure 8:
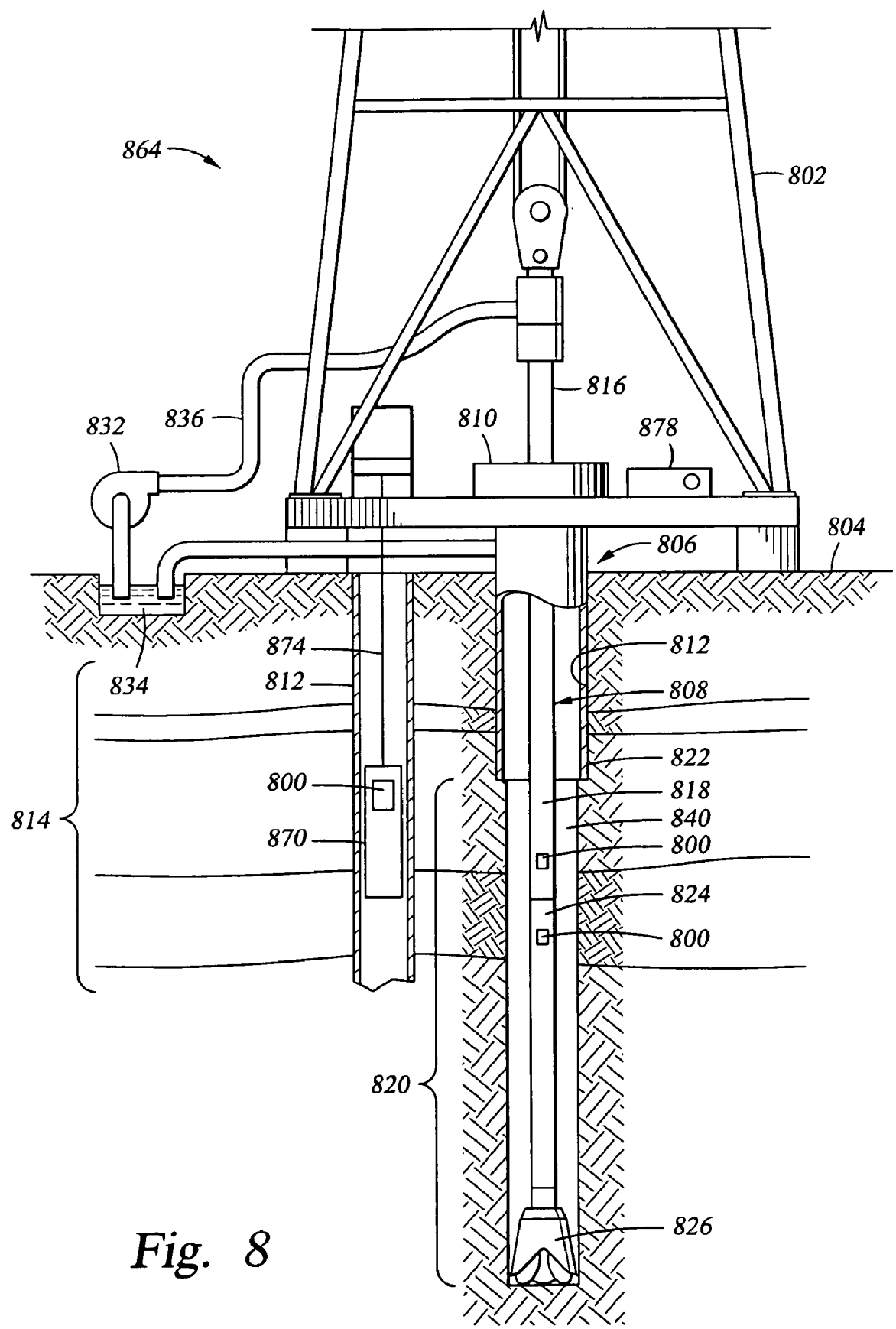
FIG. 8 is a schematic block diagram of apparatus and systems according to various embodiments of the invention.

FIG. 8 is an illustration of apparatus 800 and systems 864 according to various embodiments of the invention, which may comprise portions of a downhole tool 824 as part of a downhole drilling operation, or a tool body 870 as part of a logging operation. Thus, in some embodiments, a system 864 may form a portion of a drilling rig 802 located at a surface 804 of a well 806. The drilling rig 802 may provide support for a drill string 808. The drill string 808 may operate to penetrate a rotary table 810 for drilling a borehole 812 through subsurface formations 814. The drill string 808 may include a Kelly 816, drill pipe 818, and a bottom hole assembly 820, perhaps located at the lower portion of the drill pipe 818.

The bottom hole assembly 820 may include drill collars 822, a downhole tool 824, and a drill bit 826. The drill bit 826 may operate to create a borehole 812 by penetrating the surface 804 and subsurface formations 814. The downhole tool 824 may comprise any of a number of different types of tools including MWD (measurement while drilling) tools, LWD (logging while drilling) tools, and others.

During drilling operations, the drill string 808 (perhaps including the Kelly 816, the drill pipe 818, and the bottom hole assembly 820) may be rotated by the rotary table 810. In addition to, or alternatively, the bottom hole assembly 820 may also be rotated by a motor (e.g., a mud motor) that is located downhole. The drill collars 822 may be used to add weight to the drill bit 826. The drill collars 822 also may stiffen the bottom hole assembly 820 to allow the bottom hole assembly 820 to transfer the added weight to the drill bit 826, and in turn, assist the drill bit 826 in penetrating the surface 804 and subsurface formations 814.

During drilling operations, a mud pump 832 may pump drilling fluid (sometimes known by those of skill in the art as "drilling mud") from a mud pit 834 through a hose 836 into the drill pipe 818 and down to the drill bit 826. The drilling fluid can flow out from the drill bit 826 and be returned to the surface 804 through an annular area 840 between the drill pipe 818 and the sides of the borehole 812. The drilling fluid may then be returned to the mud pit 834, where such fluid is filtered. In some embodiments, the drilling fluid can be used to cool the drill bit 826, as well as to provide lubrication for the drill bit 826 during drilling operations. Additionally, the drilling fluid may be used to remove subsurface formation 814 cuttings created by operating the drill bit 826.

Thus, referring now to FIGS. 5, 6, and 8, it may be seen that in some embodiments, the system 864 may include a drill collar 822, a downhole tool 824, and/or a tool body 870 to house one or more apparatus 800, similar to or identical to the apparatus 500, 600 described above and illustrated in FIGS. 5 and 6. Thus, for the purposes of this document, the term "housing" may include any one or more of a drill collar 822, a downhole tool 824, and a tool body 870. The downhole tool 824 may comprise an LWD tool and an MWD tool. The tool body 870 may comprise a wireline logging tool, for example, coupled to a logging cable 874.

The apparatus 500, 600, 800; oscillator 504, 604; gyroscopes 200, 510, 610; signals of variable phase 514; summing nodes 620; excitation inputs 622; sense axis outputs 524, 624; displacement outputs 630; weights 632; controller 634; weighted outputs 636; oscillator output 638; combined outputs 546, 646; measurement circuitry 700; phase displacement 710; excitation axis signal 714; excitation drive signal 718; drilling rig 802; surface 804; well 806; drill string 808; rotary table 810; borehole 812; formations 814; Kelly 816; drill pipe 818; bottom hole assembly 820; drill collars 822; downhole tool 824; drill bit 826; mud pump 832; mud pit 834; hose 836; annular area 840; system 864; tool body 870; and logging cable 874 may all be characterized as "modules" herein. Such modules may include hardware circuitry, and/or a processor and/or memory circuits, software program modules and objects, and/or firmware, and combinations thereof, as desired by the architect of the apparatus 500, 600, 800 and systems 864, and as appropriate for particular implementations of various embodiments. For example, in some embodiments, such modules may be included in an apparatus and/or system operation simulation package, such as a software electrical signal simulation package, an alignment and synchronization simulation package, and/or a combination of software and hardware used to simulate the operation of various potential embodiments.

It should also be understood that the apparatus and systems of various embodiments can be used in applications other than for drilling and logging operations, and thus, various embodiments are not to be so limited. The illustrations of apparatus 500, 600, 800 and systems 864 are intended to provide a general understanding of the structure of various embodiments, and they are not intended to serve as a complete description of all the elements and features of apparatus and systems that might make use of the structures described herein.

Applications that may include the novel apparatus and systems of various embodiments include electronic circuitry used in high-speed computers, communication and signal processing circuitry, modems, processor modules, embedded processors, data switches, and application-specific modules, including multilayer, multi-chip modules. Such apparatus and systems may further be included as subcomponents within a variety of electronic systems, such as televisions, personal computers, workstations, vehicles, including aircraft and watercraft, as well as cellular telephones, among others. Some embodiments include a number of methods.

Figure 9:
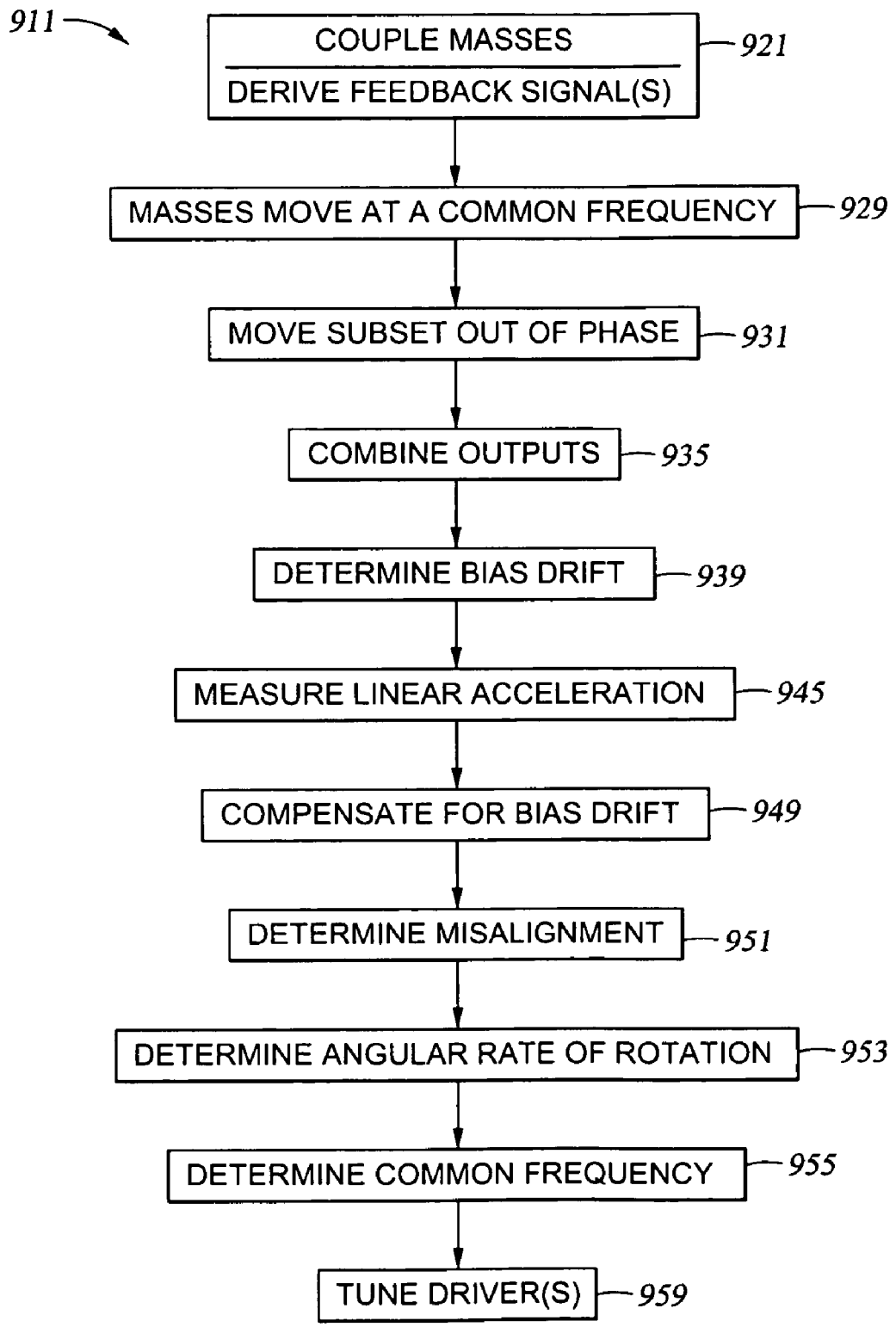
FIG. 9 is a flow chart illustrating several methods according to various embodiments of the invention.

For example, FIG. 9 is a flow chart illustrating several methods 911 according to various embodiments of the invention. In some embodiments of the invention, a method 911 may begin at block 921 with coupling a plurality of masses to provide a corresponding plurality of output signals responsive to motion relative to a common axis. Coupling the plurality of masses may further comprise deriving one or more feedback signals, such as a first and second feedback signal, from the corresponding plurality of output signals. Coupling the plurality of masses may also comprise transmitting one or more feedback signals, including the first and second feedback signals, to one or more drivers coupled to one or more groups selected from the plurality of masses.

Thus, a first feedback signal, identical or different from a second feedback signal, may be derived from the plurality of output signals, and transmitted to one or more drivers coupled to a first group of masses selected from a plurality of masses. The first feedback signal may derived from a substantially linear (or substantially nonlinear) combination of the corresponding plurality of output signals. Similarly, the second feedback signal may also be derived from the corresponding plurality of output signals (perhaps as a linear or nonlinear combination) and transmitted to another driver coupled to a second group selected from the plurality of masses. The first and second groups of masses may have the same members, have overlapping membership, or have entirely different members.

The method 911 may include periodically moving the plurality of masses at a substantially common frequency at block 929, as well as periodically moving a subset of the plurality of masses at the substantially common frequency and out of phase (e.g., any angle, including about 180 degrees out of phase) with a remainder of the plurality of masses at block 931. The activity at block 929 may also include applying a stimulus to the plurality of masses, such as an impulse, allowing the masses to achieve self-resonance, perhaps as a linked or coupled system (e.g., electrical and/or mechanical coupling), and then measuring the resonant frequency of the system. In either case, the method 911 may include combining the corresponding plurality of output signals to provide a combined signal associated with a response property of at least one of the plurality of masses at block 935.

The method 911 may include determining a bias drift of the response property of one or more of the plurality of masses at block 939. In some embodiments, the combined signal may comprise an indication of linear acceleration relative to a rest frame, and the method 911 may further comprise measuring the linear acceleration (e.g., using at least one accelerometer) at block 945. The method 911 may also include, at block 949, compensating for a bias drift as the response property, perhaps by subtracting the linear acceleration from the combined signal.

In some embodiments, the common axis may comprise an alignment axis of substantially maximum response sensitivity associated with each one of the plurality of masses. Thus, the method 911 may include determining an amount of mass response misalignment from the combined signal at block 951.

In some embodiments, the alignment axis of substantially maximum response sensitivity for each one of the plurality of masses may be aligned within about five angular degrees of the alignment axis of substantially maximum response sensitivity for every other one of the plurality of masses. In some embodiments, the common axis may comprise an alignment axis of substantially maximum response sensitivity associated with a first group of the plurality of masses, such that the alignment axis of substantially maximum response sensitivity for a second group of the plurality of masses is aligned within about five angular degrees of the alignment axis of substantially maximum response sensitivity for the first group of the plurality of masses or within about five angular degrees of an axis substantially orthogonal to the alignment axis of substantially maximum response sensitivity for the first group of the plurality of masses. Thus, a first group of gyroscopes may be aligned orthogonally to a second group of gyroscopes.

The method 911 may also include determining, from the combined signal, an angular rate of rotation about the common axis at block 953. In some embodiments, the method 911 may include determining the substantially common frequency from a response of at least two of the plurality of masses to an excitation at block 955. This determination may be made by forcing a frequency of movement among the masses using a driver, or allowing one or more masses to move in response to a vibratory stimulus, setting up a resonance among the masses which can then be measured. The method 911 may also include tuning a driver coupled to the plurality of masses to excite the plurality of masses at the substantially common frequency. Tuning may be accomplished to change the driver frequency achieve a desired resonant response. For the purposes of this document, a "driver" might include a single driver, or drive circuit, as well as a plurality of individual drivers, perhaps coupled together.

It should be noted that the methods described herein do not have to be executed in the order described, or in any particular order. Moreover, various activities described with respect to the methods identified herein can be executed in iterative, repetitive, serial, or parallel fashion. Information, including parameters, commands, operands, and other data, can be sent and received in the form of one or more carrier waves.

Upon reading and comprehending the content of this disclosure, one of ordinary skill in the art will understand the manner in which a software program can be launched from a computer-readable medium in a computer-based system to execute the functions defined in the software program. One of ordinary skill in the art will further understand the various programming languages that may be employed to create one or more software programs designed to implement and perform the methods disclosed herein. The programs may be structured in an object-orientated format using an object-oriented language such as Java or C++. Alternatively, the programs can be structured in a procedure-orientated format using a procedural language, such as assembly or C. The software components may communicate using any of a number of mechanisms well known to those skilled in the art, such as application program interfaces or interprocess communication techniques, including remote procedure calls. The teachings of various embodiments are not limited to any particular programming language or environment.

Figure 10:
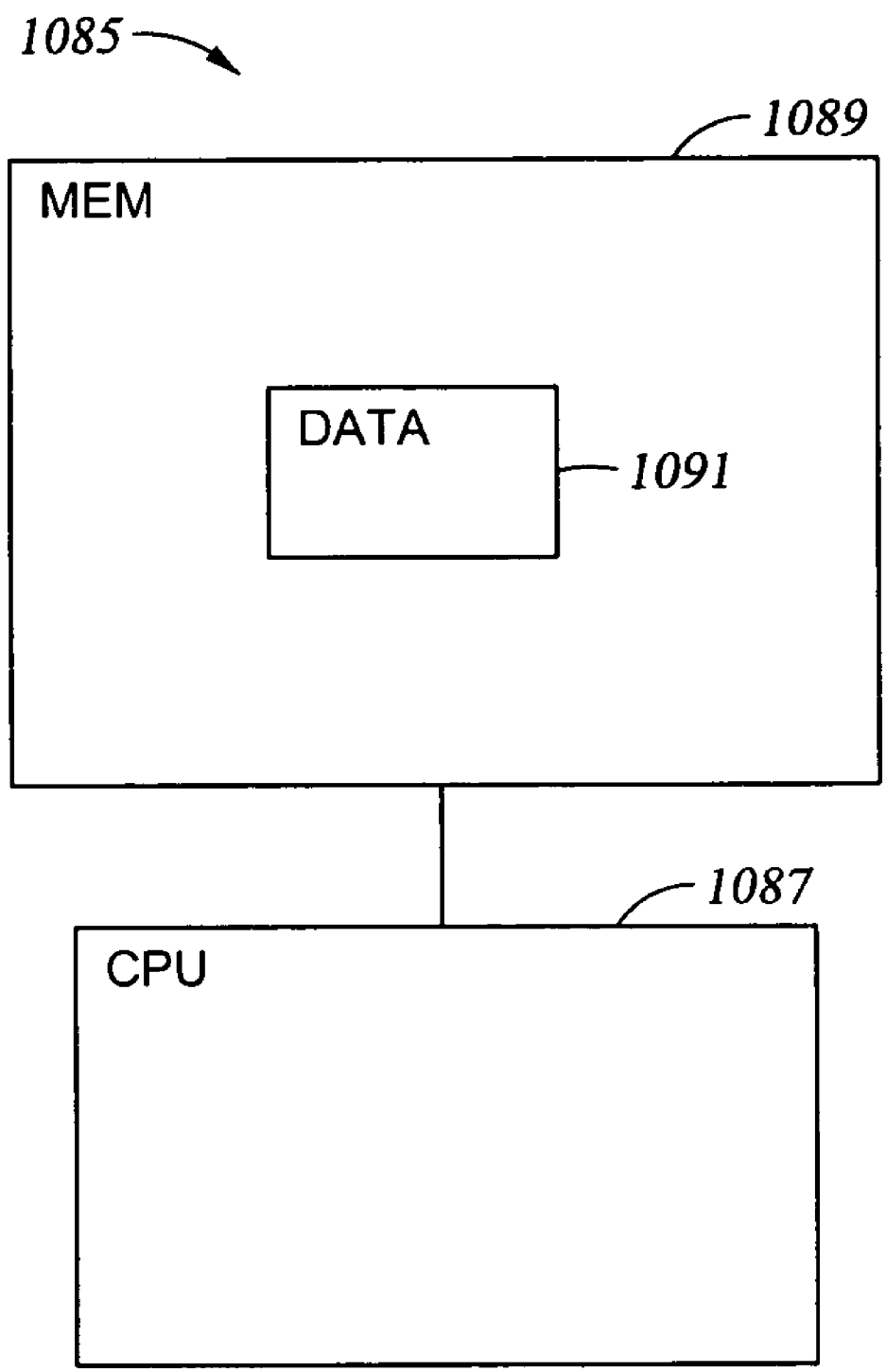
FIG. 10 is a block diagram of an article according to various embodiments of the invention.

Thus, other embodiments may be realized. For example, FIG. 10 is a block diagram of an article 1085 according to various embodiments, such as a computer, a memory system, a magnetic or optical disk, some other storage device, and/or any type of electronic device or system. The article 1085 may include a processor 1087 coupled to a machine-accessible medium such as a memory 1089 (e.g., removable storage media, as well as any memory including an electrical, optical, or electromagnetic conductor) having associated information 1091 (e.g., computer program instructions and/or data), which when accessed, results in a machine (e.g., the processor 1087) performing such actions as coupling a plurality of masses to provide a corresponding plurality of output signals responsive to motion relative to a common axis, first periodically moving the plurality of masses at a substantially common frequency, second periodically moving a subset of the plurality of masses at the substantially common frequency and out of phase with a remainder of the plurality of masses, and combining the corresponding plurality of output signals to provide a combined signal associated with a response property of at least one of the plurality of masses.

Further actions may include deriving a first feedback signal from the corresponding plurality of output signals, and transmitting the first feedback signal to at least one driver coupled to a first group of the plurality of masses. As noted previously, the common axis may comprise an alignment axis of substantially maximum response sensitivity associated with a first group of the plurality of masses, such that the alignment axis of substantially maximum response sensitivity for a second group of the plurality of masses is aligned within about five angular degrees of the alignment axis of substantially maximum response sensitivity for the first group of the plurality of masses, or within about five angular degrees of an axis substantially orthogonal to the alignment axis of substantially maximum response sensitivity for the first group of the plurality of masses.

Using the coupling apparatus, systems, and methods disclosed herein may provide improved performance over what may be obtained with a single gyroscope. In some embodiments, several inexpensive gyroscopes may be coupled together to provide a response that is more accurate than is available using a single, more expensive gyroscope. Further, in some embodiments, the use of coupled MEMS gyroscopes may provide a relatively accurate output within a fairly compact package size.

The accompanying drawings that form a part hereof, show by way of illustration, and not of limitation, specific embodiments in which the subject matter may be practiced. The embodiments illustrated are described in sufficient detail to enable those skilled in the art to practice the teachings disclosed herein. Other embodiments may be utilized and derived therefrom, such that structural and logical substitutions and changes may be made without departing from the scope of this disclosure. This Detailed Description, therefore, is not to be taken in a limiting sense, and the scope of various embodiments is defined only by the appended claims, along with the full range of equivalents to which such claims are entitled.

In this description, numerous specific details such as logic implementations, opcodes, means to specify operands, resource partitioning, sharing, and duplication implementations, types and interrelationships of system components, and logic partitioning/integration choices are set forth in order to provide a more thorough understanding of various embodiments. It will be appreciated, however, by those skilled in the art that embodiments of the invention may be practiced without such specific details. In other instances, control structures, gate level circuits and full software instruction sequences have not been shown in detail so as not to obscure the embodiments of the invention.

Such embodiments of the inventive subject matter may be referred to herein, individually and/or collectively, by the term "invention" merely for convenience and without intending to voluntarily limit the scope of this application to any single invention or inventive concept if more than one is in fact disclosed. Thus, although specific embodiments have been illustrated and described herein, it should be appreciated that any arrangement calculated to achieve the same purpose may be substituted for the specific embodiments shown. This disclosure is intended to cover any and all adaptations or variations of various embodiments. Combinations of the above embodiments, and other embodiments not specifically described herein, will be apparent to those of skill in the art upon reviewing the above description.

The Abstract of the Disclosure is provided to comply with 37 C.F.R. §1.72(b), requiring an abstract that will allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separate embodiment.

What is claimed is:

1. A method, comprising:
coupling a plurality of masses to provide a corresponding plurality of output signals responsive to motion relative to a common axis;
periodically moving the plurality of masses at a substantially common frequency and phase;
periodically moving a subset of the plurality of masses at the substantially common frequency and out of the phase with a remainder of the plurality of masses; and
combining the corresponding plurality of output signals to provide a combined signal associated with a response property of at least one of the plurality of masses.

2. The method of claim 1, further comprising:
determining a bias drift as the response property of the at least one of the plurality of masses.

3. The method of claim 1, further comprising:
determining, from the combined signal, an angular rate of rotation about the common axis.

4. The method of claim 1, wherein the combined signal comprises an indication of linear acceleration relative to a rest frame, further comprising:
measuring the linear acceleration using at least one accelerometer.

5. The method of claim 4, further comprising:
compensating for a bias drift of the response property by subtracting the linear acceleration from the combined signal.

6. The method of claim 1, wherein coupling the plurality of masses further comprises:
deriving a first feedback signal from the corresponding plurality of output signals; and
transmitting the first feedback signal to at least one driver coupled to a first group of the plurality of masses.

7. The method of claim 6, wherein the first feedback signal is derived from a substantially linear combination of the corresponding plurality of output signals.

8. The method of claim 6, wherein the first feedback signal is derived from a substantially nonlinear combination of the corresponding plurality of output signals.

9. The method of claim 6, further comprising:
deriving a second feedback signal from the corresponding plurality of output signals; and
transmitting the second feedback signal to at least another driver coupled to a second group of the plurality of masses.

10. The method of claim 9, wherein the second feedback signal is derived from a second substantially linear combination of the corresponding plurality of output signals different from a first combination of the corresponding plurality of output signals from which the first feedback signal is derived.

11. The method of claim 9, wherein the second feedback signal is derived from a second substantially nonlinear combination of the corresponding plurality of output signals different from a first combination of the corresponding plurality of output signals from which the first feedback signal is derived.

12. The method of claim 1, wherein periodically moving the subset of the plurality of masses further comprises:
periodically moving the subset of the plurality of masses at the substantially common frequency and about 180 degrees out of the phase with the remainder of the plurality of masses.

13. The method of claim 1, wherein the common axis comprises an alignment axis of substantially maximum response sensitivity associated with each one of the plurality of masses.

14. The method of claim 13, further comprising: determining an amount of mass response misalignment from the combined signal.

15. The method of claim 13, wherein the alignment axis of substantially maximum response sensitivity for each one of the plurality of masses is aligned within about five angular degrees of the alignment axis of substantially maximum response sensitivity for every other one of the plurality of masses.

16. The method of claim 1, wherein the common axis comprises an alignment axis of substantially maximum response sensitivity associated with a first group of the plurality of masses, and wherein the alignment axis of substantially maximum response sensitivity for a second group of the plurality of masses is aligned within about five angular degrees of the alignment axis of substantially maximum response sensitivity for the first group of the plurality of masses or within about five angular degrees of an axis substantially orthogonal to the alignment axis of substantially maximum response sensitivity for the first group of the plurality of masses.

17. The method of claim 1, further comprising:
determining the substantially common frequency from a response of at least two of the plurality of masses to an excitation; and
tuning a driver coupled to the plurality of masses to excite the plurality of masses at the substantially common frequency.

18. An apparatus, comprising:
a plurality of masses coupled to provide a corresponding plurality of output signals responsive to motion relative to a common axis;
a driver module to periodically move the plurality of masses at a substantially common frequency and phase, and to periodically move a subset of the plurality of masses out of the phase with a remainder of the plurality of masses; and
a combination module to combine the corresponding plurality of output signals to provide a combined signal associated with a response property of at least one of the plurality of masses.

19. The apparatus of claim 18, wherein the plurality of masses comprise:
at least one pair of masses coupled to a common coupling beam.

20. The apparatus of claim 18, wherein the plurality of masses comprise:
a single MEMS gyroscope.

21. The apparatus of claim 18, wherein the plurality of masses comprise:
a first proof mass in a first MEMS gyroscope and a second proof mass in a second MEMS gyroscope.

22. The apparatus of claim 18, further comprises:
a first driver circuit to receive a first feedback signal derived from the corresponding plurality of output signals and to drive a first group of the plurality of masses.

23. The apparatus of claim 22, wherein the first feedback signal is derived from a substantially linear combination of the corresponding plurality of output signals.

24. The apparatus of claim 22, wherein the first feedback signal is derived from a substantially nonlinear combination of the corresponding plurality of output signals.

25. The apparatus of claim 22, further comprising:
a second driver circuit to receive a second feedback signal derived from the corresponding plurality of output signals and to drive a second group of the plurality of masses.

26. The apparatus of claim 25, wherein the second feedback signal is derived from a second substantially linear combination of the corresponding plurality of output signals different from a first combination of the corresponding plurality of output signals from which the first feedback signal is derived.

27. The apparatus of claim 25, wherein the second feedback signal is derived from a second substantially nonlinear combination of the corresponding plurality of output signals different from a first combination of the corresponding plurality of output signals from which the first feedback signal is derived.

28. The apparatus of claim 18, wherein the driver module operates to periodically move the subset of the plurality of masses at the substantially common frequency and about 180 degrees out of the phase with the remainder of the plurality of masses.

29. The apparatus of claim 18, wherein the common axis comprises an alignment axis of substantially maximum response sensitivity.

30. The apparatus of claim 29, wherein the alignment axis of substantially maximum response sensitivity for each one of the plurality of masses is aligned within about five angular degrees of the alignment axis of substantially maximum response sensitivity for every other one of the plurality of masses.

31. The apparatus of claim 18, wherein the common axis comprises an alignment axis of substantially maximum response sensitivity associated with a first group of the plurality of masses, and wherein the alignment axis of substantially maximum response sensitivity for a second group of the plurality of masses is aligned within about five angular degrees of the alignment axis of substantially maximum response sensitivity for the first group of the plurality of masses or within about five angular degrees of an axis substantially orthogonal to the alignment axis of substantially maximum response sensitivity for the first group of the plurality of masses.

32. The apparatus of claim 18, further comprising:
an accelerometer to measure, as a portion of the combined signal, linear acceleration relative to a rest frame.

33. An article comprising a machine-accessible medium having associated information, wherein the information, when accessed, results in a machine performing:
coupling a plurality of masses to provide a corresponding plurality of output signals responsive to motion relative to a common axis;
periodically moving the plurality of masses at a substantially common frequency and phase;
periodically moving a subset of the plurality of masses at the substantially common frequency and out of the phase with a remainder of the plurality of masses; and
combining the corresponding plurality of output signals to provide a combined signal associated with a response property of at least one of the plurality of masses.

34. The article of claim 33, wherein the machine-accessible medium further includes data, which when accessed by the machine, results in the machine performing:
deriving a first feedback signal from the corresponding plurality of output signals; and
transmitting the first feedback signal to at least one driver coupled to a first group of the plurality of masses.

35. The article of claim 33, wherein the common axis comprises an alignment axis of substantially maximum response sensitivity associated with a first group of the plurality of masses, and wherein the alignment axis of substantially maximum response sensitivity for a second group of the plurality of masses is aligned within about five angular degrees of the alignment axis of substantially maximum response sensitivity for the first group of the plurality of masses or within about five angular degrees of an axis substantially orthogonal to the alignment axis of substantially maximum response sensitivity for the first group of the plurality of masses.

36. A system, comprising:
an apparatus including a plurality of masses coupled to provide a corresponding plurality of output signals responsive to motion relative to a common axis, a driver module to periodically move the plurality of masses at a substantially common frequency and phase, and to periodically move a subset of the plurality of masses out of the phase with a remainder of the plurality of masses, and a combination module to combine the corresponding plurality of output signals to provide a combined signal associated with a response property of at least one of the plurality of masses; and
one of a drill collar, a downhole tool, and a tool body to house the apparatus.

37. The system of claim 36, wherein the downhole tool comprises a tool selected from one of a wireline logging tool and a logging while drilling (LWD) tool.

38. The system of claim 36, wherein the plurality of masses comprise:
a single MEMS gyroscope.

* * * * *